United States Patent [19]
Ross

[11] 3,741,559
[45] June 26, 1973

[54] OSCILLATORY MOTION COUPLER

[76] Inventor: Frederick W. Ross, 755 Klamath Drive, Del Mar, Calif. 92014

[22] Filed: Dec. 7, 1970

[21] Appl. No.: 95,525

[52] U.S. Cl. .............................................. 267/124
[51] Int. Cl. .............................................. F16f 9/18
[58] Field of Search .................................. 267/124

[56] References Cited
UNITED STATES PATENTS
3,089,393  5/1963  Pagendarm ........................ 267/124

Primary Examiner—James B. Marbert
Attorney—Carl R. Brown and Neil F. Martin

[57] ABSTRACT

A oscillatory motion coupler which when excited in oscillation transfers oscillatory motion induced in a cylinder to a piston free to oscillate within that cylinder. When excited at the natural frequency of the coupler the oscillatory motion can be amplified. The piston includes a piston rod to transfer the force on said piston to the exterior of the cylinder. Associated with the cylinder are passive pneumatic passages which offset the natural tendency of the piston oscillation center to move from its original location to one end of the cylinder or the other. The passages maintain the center of oscillation within the confines of the cylinders so as to prevent impact of the piston against either end thereof.

22 Claims, 13 Drawing Figures

INVENTOR.
FREDERICK W. ROSS
BY Carl R. Brown
ATTORNEY

INVENTOR.
FREDERICK W. ROSS

BY Carl R. Brown

ATTORNEY

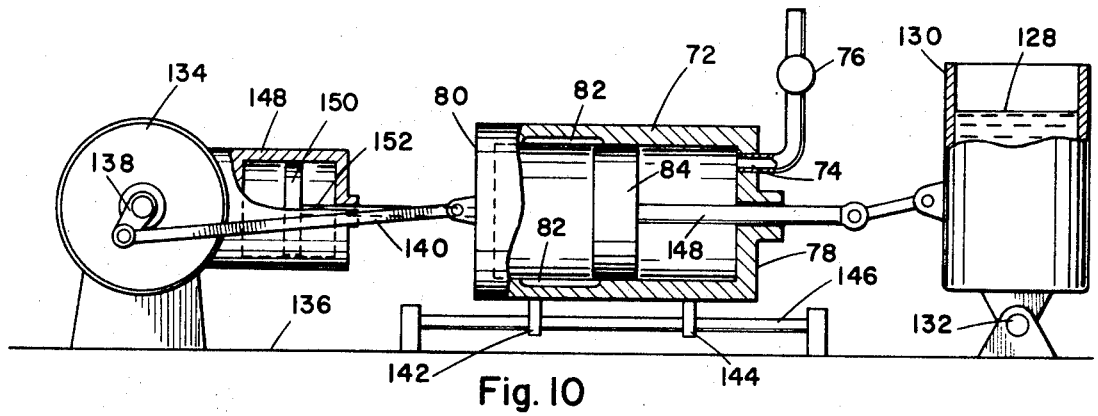
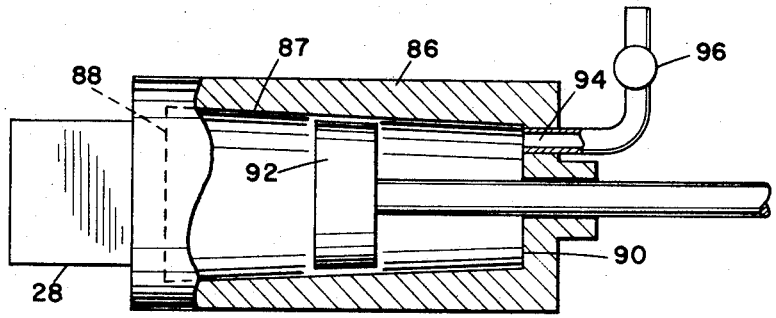
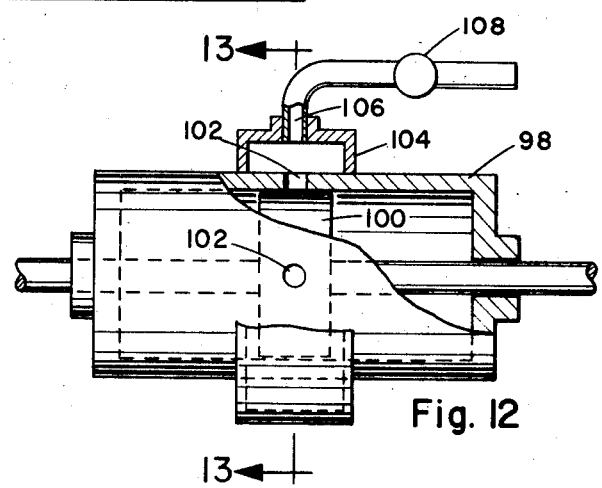
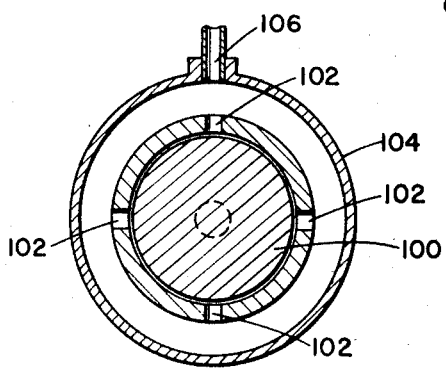

OSCILLATORY MOTION COUPLER

BACKGROUND OF THE INVENTION

In the field of oscillation devices pneumatic piston cylinder combinations are frequently employed to dampen, transfer or couple and to amplify exciting oscillations. A particular configuration known as a double acting air spring employs a piston fitted within a cylinder so as to be able to oscillate freely along the principal axis of the cylinder. In some applications provision is made for a piston rod or rods to exit the cylinder through sealing bearings respectively at one end or at opposite ends of the cylinder. By a proper combination of cylinder length, piston cross-sectional area, and of the type and pressure of gas inside the cylinder, a selected spring constant may be produced. In applications where resonance is wanted this spring constant when acting in relation to the mass of the piston and any mass attached to the piston by the piston rod comprises an oscillatory system which will be resonant at the frequency selected for excitation. When the aforementioned conditions are met and the cylinder is forced to oscillate at the excitation frequency, the piston is induced to oscillate in resonance.

In such a system whether resonance is used or not it is important to keep the friction between the piston and cylinder walls to as low a level as possible consistent with good sealing. Excessive levels of friction will result in excessive power requirements for excitation. As a consequence in a practical device, a compromise must be drawn between perfect sealing and allowable wall friction.

Even with closely fitting piston rings the air leakage past the piston leads to the major failing of these double acting air springs, the failing is that as the piston oscillates first toward one end of the cylinder and then toward another, the leakage flow eventually causes an imbalance in the mass of air on one side of the piston as compared with that on the other side of the piston. This causes the mean oscillatory position of the piston to move, slowly at first, then at an increasing rate, toward one end of the cylinder. If allowed to progress, the excursion will continue until the piston impacts against the cylinder. This impact, sometimes with destructive force, drastically changes the nature of the oscillation as well as the location of the center of oscillation of the piston. In some highly specialized applications, it suffices to strengthen and/or cushion the end of the cylinder so as to make it capable of withstanding this onslaught, but for most applications a technique must be employed which will maintain the mean oscillatory position of the piston at a point near the longitudinal center of the cylinder.

In the past, various devices and techniques have been proposed to prevent this destructive and undesirable excursion of the piston mean oscillatory point. The more complex of these provides pneumatic plumbing including a means for valving gas at a higher than ambient pressure into either end of the cylinder. An operator is provided with visual or other indication of the position of the pistons mean oscillatory point. As the oscillatory point progresses toward one end of the cylinder, the operator valves gas into that end thereby forcing the piston back toward the longitudinal center of the cylinder and maintaining a kind of balance. Other systems eliminate the operator through the use of an automatic servo system which accomplishes the same job of pumping gas to one side of the piston or the other as required to maintain a substantially constant mean oscillatory position for the piston. Such a system unnecessarily complicates the manufacture and maintenance of such a double acting air spring and makes the device for most applications prohibitively expensive. Others have attempted to eliminate the unstable condition by eliminating all leakage past the piston. This has been accomplished by fitting a suitable flexible gastight diaphragm between the piston and cylinder wall and thereby stopping all leakage. This solution is unsatisfactory because of the high flexure stresses which are transmitted to the diaphragm during oscillatory motion of the piston, necessitating frequent service and replacement of the diaphragm, additionally such a diaphragm has a damping effect on the oscillations thereby increasing the requirements for excitation.

The aforementioned disadvantages of the previously employed solutions to the dynamic instability problem in prior art double acting air springs have limited their utilization. The full potential of double acting air springs has awaited a simple and effective solution for this instability. The instant invention provides the stability sought in prior art devices and does so in a manner which produces a simple, effective and economical device.

SUMMARY OF THE INVENTION

The oscillatory motion coupler of the invention incorporates passage means that by the inherent nature of the pneumatic system and under the influence of the piston adjust the quantity of gas in the opposite ends of the cylinder so as to stabilize the location of the mean oscillatory point with respect to the cylinder. The passage means are passive, that is, that after initial set up no sensing of nor response to the mean oscillatory point is necessary to maintain that point within safe and desirable confines. In every embodiment, the invention admist of the utilization of a piston with sufficient wall clearance to produce a low sliding friction that is desirable for maximum response to oscillatory excitment. Such piston cylinder clearances are referred to by those versed in the art as "running fits". The air leakage which results from this clearance between cylinder wall and piston is either compensated for, or it is actually utilized in, the stabilization of the oscillatory mean point. The various embodiments of the instant invention accomplish this stabilization in two related manners. The first is based on the provision of gas passage means for transferring or venting of gas within the piston cylinder combination, the passage means being so located in relation to the piston motion that the pumping and valving action of the piston maintains an equal average pressure of that gas on either side of the piston. The second related technique employed in the instant invention is the provision of passage means within the cylinder which intentionally induce instability in a known direction under the oscillatory condition. By providing two equal and opposite tendencies to instability, the piston oscillation mean point is stabilized.

An example of an embodiment of the invention incorporating the first technique of stabilization would be a piston cylinder combination with one or more vents located near the midpoint of the cylinder and communicating from the interior of the cylinder with the surrounding atmosphere. With the piston oscillating so that its mean oscillation point corresponds substantially with the position of the vent and therefore substantially the cylinders midpoint, approximately equal masses of gas are contained at opposite ends of the cylinder. When the tendency for instability due to leakage past the piston moves the mean oscillatory point to one side of center a greater quantity of gas is located on one side of the piston than the other. Therefore when the piston is at the cylinder midpoint, a pressure differential exists. That is, the gas on one side of the piston is at a pressure higher than surrounding atmospheric and on the other side lower. As the piston moves away from the cylinder midpoint, it unports the vent to the atmosphere and gas is alternately vented from the high pressure side and induced into the low pressure side. In this manner the gas pressure on either side of the piston is equalized and the mean piston oscillatory point is stabilized. In devices that use a relatively short piston excursion, dual vents may be provided to accomplish the same equalizing effect. Also utilizing the principal of equalizing the mass of air on opposite sides of the piston are embodiments incorporating passage means which effectively increase the air leakage past the piston over a limited portion of the pistons permissable excursion. These passage means are located over the entire length of the normal desired piston travel. As the piston oscillates in these devices, as in any such device that permits leakage past the piston, the tendency to instability will eventually move the mean oscillatory point off center so that the piston at its point of maximum excursion is beyond the passage means increasing the air leakage. At this point, however, the region containing the passage means creating increased leakage past the piston will be effecting a flow of air from the opposite end of the cylinder toward the direction in which the instability has move the oscillation mean point. This is because the piston tends to oscillate about a point at which the pressure is equal on opposite sides. This point moves with the piston oscillation mean point when instability occurs. Therefore the pressure differential caused by piston travel causes flow in a direction which tends to force the piston oscillation mean point back toward the longitudinal center of the cylinder. These passage means may take the form of spaced vents located at opposite ends of the intended average maximum excursion for the piston. These vents are interconnected and tend to increase air leakage equally in both directions as long as the piston oscillates between the vents. As the piston oscillation mean point moves the maximum excursion of the piston will eventually take it beyond one or the other of the vents. When the piston is beyond either of the vents, the leakage passage is solely through the piston wall interface and therefore is much reduced over the augmented leakage when the piston is oscillating in its normal region. This produces the stabilizing effect previously described. In a similar manner, one or more grooves may be provided in the cylinder walls extending over the average intended maximum excursion for the piston. These grooves again augment the leakage past the piston only, when it is oscillating in its intended range, and therefore produced the same stabilizing effect. Still another manner of accomplishing this augmented leakage is the provision of a double taper over the intended operating range. The taper extending to its maximum diameter at the midpoint of the range. This form of the invention produces an even stronger tendency to maintain the stability of the oscillation mean point since the leakage is at its maximum in the precise center of the intended range.

The second related technique of stabilization, that utilizing opposing tendencies to instability, may incorporate one or more of the previously discussed passage means such as vents, tapered cylinders or wall grooves and may further take advantage of the inherent tendency for the instability to move the piston mean point in a particular direction. For example, if it can be determined that the piston tends to move instabily towards a particular end of the cylinder then only a single means effective to produce a tendency toward instability to the opposite direction need be employed. An inherent tendency toward instability in a particular direction often exists where the piston shaft extends out of the cylinder at only one end thereof, or where the piston shaft extending out of one end of the cylinder is significantly larger than that extending out of the other end. The effect of these shaft variations produces a difference in volume from one end of the cylinder to the other. Since the mass of leakage past the piston is the same in both directions the end of the cylinder with the smaller average volume will have a larger pressure drop for the same leakage rate and therefore, the piston will tend to move toward that end. Locating a vent at the opposite end of the cylinder will produce the opposite tendency. That is, acting alone, the vent would tend to cause the piston oscillation mean point to move toward the end of the cylinder containing the vent. By proper selection of the vent size or by the incorporation of a valve to allow subsequent adjustment of the vent, the tendency toward instability to opposite ends of the cylinder can be balanced, this results in a stable condition wherein the piston oscillation mean point is retained at or near the longitudinal center of the cylinder.

In a similar manner the other previously described passage means may be incorporated at opposing ends of the cylinder to produce balancing tendencies toward movement in opposite directions and thereby create a stable oscillatory condition. For example, the longitudinal grooves in the cylinder wall may be incorporated at one end only of a cylinder. By increasing the bypass at that end of the cylinder, they create a tendency for the piston to move toward that end. An end vent as previously described could produce the counterbalancing tendency to move toward the opposite end. Also a taper may be employed to create a tendency to move toward one end of a cylinder. Such a taper would extend along the whole length of the cylinder progressing from a relatively large diameter at one end to a smaller diameter at the opposite end. The leakage past the piston would be at a maximum at the larger end of the cylinder and thereby would create a tendency for the piston to move in that direction. Again a counterbalancing tendency by a vent or other means as described hereinbefore would create a balanced condition.

The invention also contemplates the necessity for varying the gas type and pressure utilized in the piston cylinder combination to obtain varying spring constants. When used with the venting type of stabilizing means, a utilization of gas other than air at atmospheric pressure necessitates the use of a plenum chamber. This chamber must be sufficiently large to produce an artificial ambient pressure and would surround all of the vents utilized. Gas from an external source can be pumped into the plenum chamber and the pressure within the chamber cylinder combination may be maintained at a level which produces the proper spring constant.

The aforementioned variations of the invention all accomplish the stabilization of the mean point of oscillation of the piston without the necessity for automatic servo mechanisms or other complex supplemental equipment, and further without the requirement of an operator or attendant to maintain a stabilized condition. Double air springs resulting from the practice of the instant invention are not only less expensive but more compact and lighter in weight. This opens the way for the utilization of air springs in devices which previously could not accommodate them. Further, devices built according to the invention have no additional moving parts, this contributes to maintenance free operation over long periods.

It is therefore an object of this invention to provide a new and improved oscillatory motion coupler.

It is another object of this invention to provide a new and improved oscillatory motion coupler that stabilizes the mean point of piston oscillations.

It is another object of this invention to provide a new and improved oscillatory motion coupler wherein the stabilization of the piston oscillation mean point is accomplished without complex electronic or mechanical controls.

It is another object of this invention to provide a new and improved oscillatory motion coupler wherein the mean point of the pistons oscillations is stabilized by the use of passive passage ways.

It is another object of this invention to provide a new and improved oscillatory motion coupler wherein the gas flow necessary to achieve stabilization is produced by the action of the piston within the cylinder during its oscillatory travel.

It is another object of this invention to provide a new and improved oscillatory motion coupler which is inexpensive, light in weight and compact.

Other objects and many advantages of this invention will become more apparent upon a reading of the following detailed description and an examination of the drawings wherein like reference numerals designate like parts throughout.

BRIEF DESCRIPTION OF THE DRAWINGS

FIG. 10 is a cut away side elevation view of an end vented structure, coupled to associated apparatus.

FIG. 11 is a cut away side elevational view of an alternative end vented structure.

FIG. 12 is a cut away view similar to FIG. 1, but with a vent enclosing jacket.

FIG. 13 is a sectional view taken on line 13—13 of FIG. 12.

Figure 1:
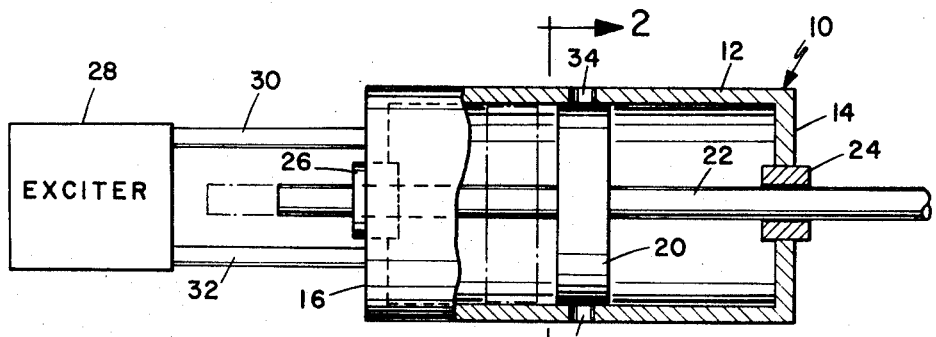
FIG. 1 is a side elevation view, partially cut away, of a basic form of the coupler.

Referring to the drawing, FIGS. 1 through 13 all illustrate piston cylinder combinations with various forms of passive passageways to stabilize the mean point of the piston oscillations. In every case except FIG. 4, the cylinder has been illustrated as the portion of the device which accepts the input excitation. The invention is equally applicable to such devices when the input excitation is carried by the piston and the cylinder is made to oscillate in resonance under the action of the piston. In this latter case the cylinder would be secured to the system into which work is to be inputted rather than the piston shaft as is shown in the drawings. Additionally it is possible to have both the input and output from the same portion of the device such as in FIG. 4 where both input and output is via the piston.

Furthermore while the invention is described in terms of a single double acting piston cylinder combination, the same principles apply if two opposed single acting piston cylinders are used. The work piece could be secured to each piston so as to oscillate under the influence of both pistons. The vents or other means of stabilization would then function in a manner similar to that described for the separate halves of the double acting cylinder.

In FIG. 1, there is illustrated a cylinder 10 having a cylindrical portion 12 and end portions 14 and 16. Mounted within the cylinder for reciprocating motion along its longitudinal axis is a piston 20, the piston is supported on a piston shaft or rod 22. The rod is in turn supported by sealing bearings 24 and 26 at opposite ends of the cylinder. As the piston moves toward either end of the cylinder the air or other gas ahead of it is compressed and exerts an increasing restoring force. This restoring force is the spring action for which the double acting air spring is named. The piston is made to oscillate by forces transferred to it from this spring action when the cylinder oscillates substantially along its longitudinal axis. Oscillations are induced into the cylinder by exciter 28 working through transfer rods 30 and 32. As the cylinder 10 oscillates under the influence of the exciter 28, the piston 20 also begins to oscillate under the forces transferred to it by the air spring effect. If this system is tuned the oscillations will proceed to resonance whereby a larger excursion of piston 20 can be obtained. As piston 20 moves away from the cylinder midposition it unports vents 34 which are spaced around the periphery of the cylinder near the longitudinal midpoint. For example if the piston 20 moves toward the right in FIG. 1, it will allow the left end of cylinder 10 to be vented to the surrounding atmosphere through vents 34 and gas will flow through vent 34 in a direction which tends to bring the left side of cylinder 10 to atmospheric pressure. Similarly as the piston 20 moves to the left side of the cylinder any excess or deficiencies of gas in the right side of cylinder 10 will tend to be reduced or eliminated by flow through vent 34. As the oscillations continue over a number of excursions a balance in the air pressure on either side of the piston will be attained. This is the case even though air leakage past piston 20 may have an unbalancing effect. Any unbalancing effect caused by air leakage between the piston and cylinder walls will be counterbalanced by a flow through vent 34 and without external disturbances the mean point of oscillation for piston 20 will stabilize at or near the longitudinal center of cylinder 10. The vents 34 have been found to be effective over a wide range of sizes. Stabilization occurs most rapidly with large and/or numerous vents. However, if the vent becomes too large, it will have a damping effect on the pistons oscillations. Conversely, if the vent size is too small, stabilization will occur over too long a period of time. The minimum size vent which assures stabilization for all conditions is that vent which produces a flow in excess of the leakage flow past the piston cylinder interface.

Figure 3:
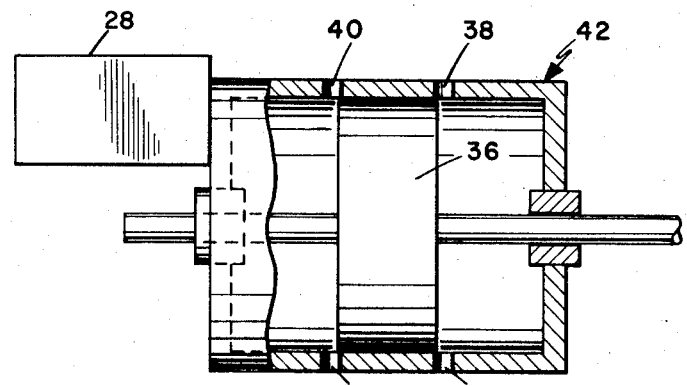
FIG. 3 is a cut away side elevation view of an alternative structure.

A single vent or series of vents located at the midpoint of a cylinder as shown in FIG. 1 is satisfactory for most applications. However, in those applications where a very small piston excursion is desired, a dual vent system as illustrated in FIG. 3 will be required. In this embodiment the piston 36 is large enough and the expected piston excursions are small enough that a single vent system would not be unported by the piston during its travel. Two series of ports 38 and 40 are located through the walls of cylinder 42 at points spaced on equal distance from the desired mean point of piston oscillations. By this placement only a small excursion of the piston is necessary to allow communication from the atmosphere to the interior of the cylinder. This communication and the resulting flow would alternately take place through vent system 40 and vent system 38 as the piston oscillates.

Figure 2:
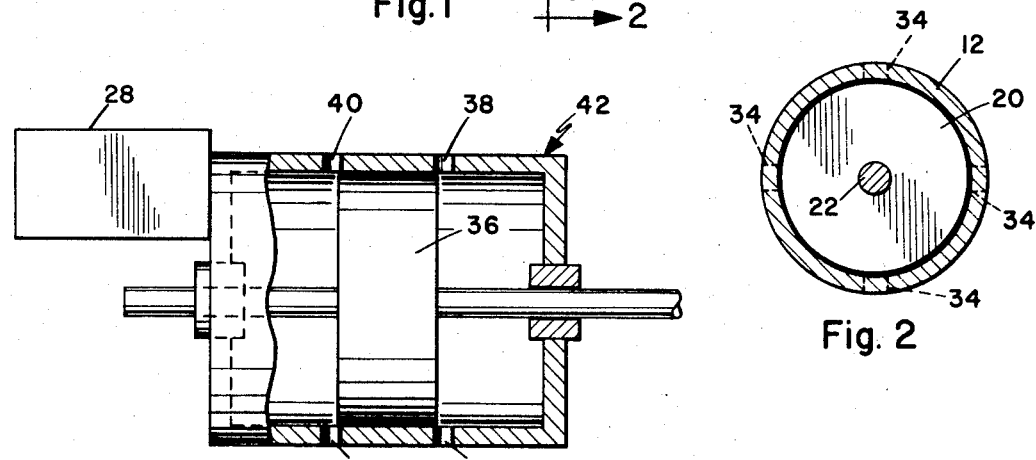
FIG. 2 is a sectional view taken on line 2—2 of FIG. 1.

The device of FIGS. 1 through 3 could be said to achieve the stabilization of the piston by pressure balancing, that is, they function to maintain a pressure balance between opposite sides of the piston when the piston is at the mean point of its oscillatory travel. The variations of the invention shown in FIGS. 4 through 9 also utilize the pressure balancing technique but do not require venting to the atmosphere as in FIGS. 1 through 3. This non-venting characteristic may be useful in situations where noise, dirt safety or other considerations dictate a sealed unit or where a gas other than air is employed.

Figure 4:
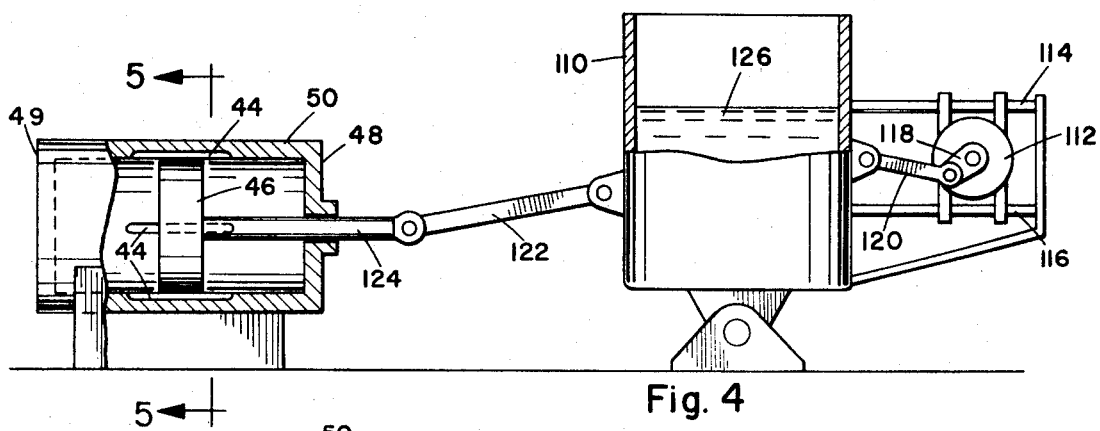
FIG. 4 is a cut away side elevation view of an internally vented form, in use with associated apparatus.
Figure 5:
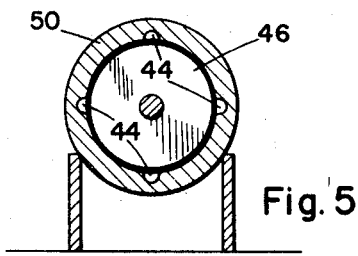
FIG. 5 is a sectional view taken on line 5—5 of FIG. 4.
Figure 6:
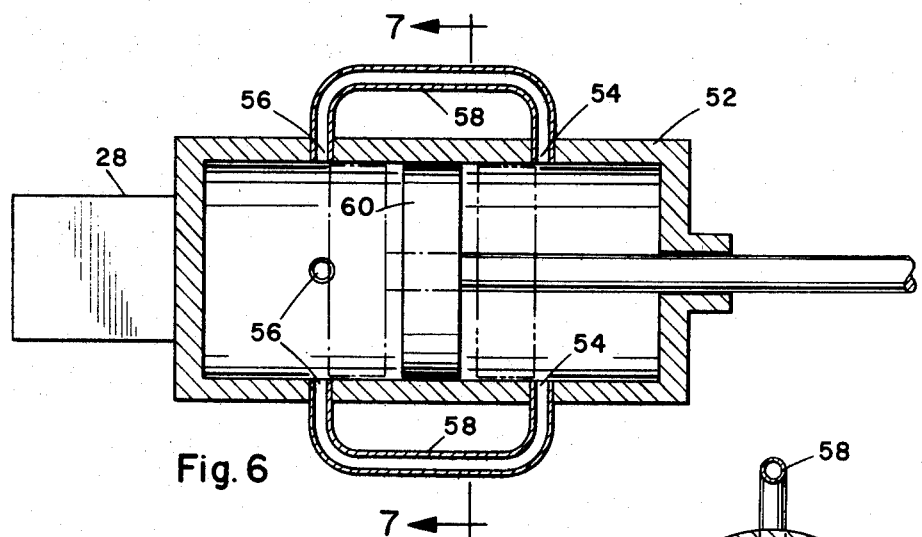
FIG. 6 is a longitudinal sectional view of a coupled vent form of structure.
Figure 7:
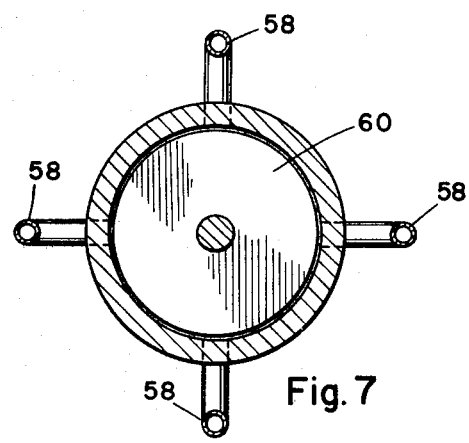
FIG. 7 is a sectional view taken on line 7—7 of FIG. 6.

In FIG. 4 and 5 the passage means employed for pressure balancing is a series of grooves 44 which extend over the entire distance of intended piston excursion. These grooves have the effect of increasing the gas leakage past the piston while the piston is operating over the length of the grooves. With the piston 46 oscillating, the inherent tendency toward instability will eventually produce an excursion of the piston oscillation mean point toward one end of the cylinder or the other. For example, the oscillation mean point may begin to move toward end 48 until eventually it will pass beyond the area of the cylinder with grooves 44. With the piston operating in the ungrooved portion of the cylinder the effective leakage past the piston is reduced, reducing the flow from end 48 of cylinder 50 to end 49. On the opposite end of the stroke however, during the entire portion of the stroke during which the pressure is higher in end 49 of the cylinder than in the opposite end, the piston is travelling in the grooved portion of the cylinder. As a result increased gas leakage flow occurs during the entire time the piston is in this end of its stroke. This differentiation in flow from end 49 to end 48 as compared with flow from end 48 to end 49 eventually will force the piston oscillation mean point back into the center of the grooved range of the cylinder. The piston cylinder combinations of FIGS. 6 and 8 take advantage of the small effect. In FIG. 6 the groove system is replaced by spaced interconnected vents. Thus cylinder 52 has two series of vents 54 and 56 interconnected by a series of passages 58. Again as long as the piston 60 oscillates within a range not exceeding at its extremes either the position of vent 56 or that of vent 54 the effect of the vent system is merely to increase the leakage flow in the same direction as that normally passing by the piston wall interface. When the piston oscillation mean point moves so that the maximum excursion of the piston covers, for example, vent 54, the leakage for the remainder of the travel is that past the piston wall interface only whereas on the return stroke, during that portion of the stroke for which leakage flow is from left to right, both leakage past the piston and through the vent system occur.

Figure 8:
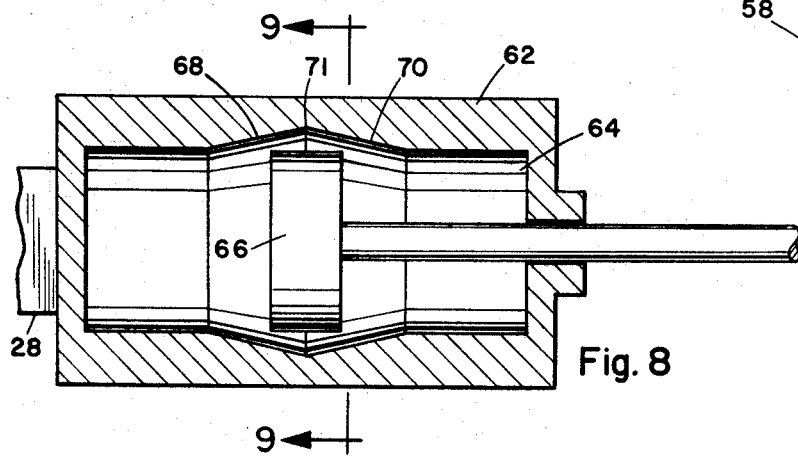
FIG. 8 is a longitudinal sectional view of another internally vented form.
Figure 9:
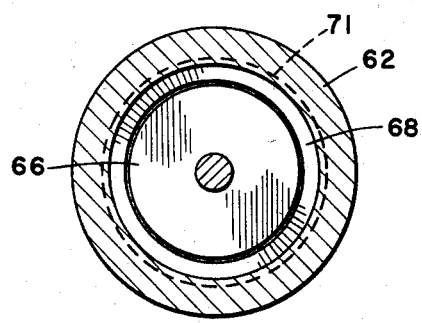
FIG. 9 is a sectional view taken on line 9—9 of FIG. 8.

FIG. 8 shows an additional variation of the pressure balancing means. Here the cylinder 62 has a bore 64 which enlarges in a dual taper usually small over the intended operating range for piston 66. The dual taper portion includes tapers 68 and 70 which meet at point 71. Since the clearance between the cylinder walls and the piston increases along portions 68 and 70 to the maximum at point 71, the leakage flow will be greatest at this point and will be reduced to a minimum only when the piston operates out of the taper portion of bore 64. Piston 66 will operate within its normal range until the tendency to instability causes an excursion of the mean point beyond the taper portion of the bore. At this point leakage will drop to a minimum value whereas in the opposite stroke leakage will be at a higher value throughout the entire leaking portion of the stroke. This unbalance will produce the stabilizing tendency previously described and the piston oscillation mean point will move toward the center. In fact in this variation of the invention the tendency to stay at the midpoint of the cylinder is accentuated since leakage reaches a maximum at this point.

The forms of the invention illustrated in FIGS. 10 through 13 employ the second related technique for stabilizing piston oscillations, that is, they employ opposing and balancing tendencies toward instability. In FIG. 10 for example, the cylinder 72 is shown fitted with an end vent 74 and valve 76. The end vent 74 penetrates cylinder end 78 and through valve 76 allows communication with the atmosphere. At the opposite end of the cylinder beginning adjacent to end 80 are longitudinal grooves 82 which may be configured in a manner similar to those shown in FIGS. 4 and 5. The placement of these grooves near the end 80 would by themselves produce a tendency for the piston oscillation mean point to move toward end 80. This is due to the increased leakage past the piston 84 during the portions of its stroke when it is in the area of the cylinder having grooves 82. The primary effect of the increased leakage is to transfer gas past the piston 84 to the end 78 of the cylinder and therefore cause the piston to oscillate about a mean point displaced toward end 80. Were no counterbalancing effect provided, piston 84 would move toward and eventually impact end 80 of the cylinder. However by allowing some leakage out of end 78 of the cylinder the excess gas which bypasses the piston 84, will be vented to the atmosphere and a stabilized condition will eventually be reached. The valve 76 is provided to permit regulation of the exact point at which the oscillation mean point stabilizes. The vent 74 is illustrated as a separate orifice through the end wall 78 however any means for venting through a fixed or adjustable orifice would promote the stabilization described. For example the fit of seal 78 may be regulated to allow some leakage past the seal or the piston rod may be grooved over the area which passes through the seal to promote some leakage.

In FIG. 11, there is illustrated a second form of the invention utilizing counterbalancing tendencies toward instability. Cylinder 86 is illustrated as having a small taper on its inner bore 87 which produces the largest inner diameter at end 88 and tapers to a narrower diameter 90. The taper as illustrated is much exaggerated and in practice be made slight enough to produce only a very small variation in the leakage rate past the piston 92 end of the cylinder to the other. As will appear from the drawing the leakage past piston 92 will be at its greatest when the piston is near end 88 and a tendency for the piston oscillation mean point to move toward end 88 will be produced. As a counterbalancing tendency vent 94 is provided in end 90, the vent 94 is illustrated as having a valve 96 for regulating the piston oscillation mean point as in FIG. 10. FIGS. 12 and 13 show a modification to the invention which may be applied to any of the various forms which are vented to the atmosphere such as those in FIGS. 1 through 3 and 10 and 11. As illustrated in FIG. 12 shows a cylinder 98, piston 100 and a series of center vents 102 similar to those illustrated in FIG. 1. Instead of venting to the atmosphere as in FIG. 1, however center vents 102 exhaust to a plenum chamber 104. Chamber 104 is sealed from the atmosphere and may be pressurized with any gas desired through pipe 106 and valve 108.

The operation of the oscillatory motion device of the invention can be best understood by reference to its use in a specific environment such as that illustrated in FIG. 4. The invention is utilized here for accentuating and amplifying the oscillations induced into a work unit or tank 110. Tank 110 is induced to oscillate by the oscillations of motor 112 along sliders 114 and 116. The oscillatory motion of the motor is produced when crank 118 is rotated and through its connection with arm 120 forces an oscillatory movement of the motor on sliders 114 and 116. The frame of tank 110 transfers this force through arm 122 and piston rod 124 to piston 46. Piston 46 is therefore induced to oscillate. In some applications with proper system design the motor tank and piston combination can be made to oscillate in resonance by exciting the combination at their natural frequency, whereby the amplitude of the oscillations will be much increased and the aggregate material 126 in tank 110 will be thoroughly agitated.

FIG. 10 shows another system for agitating an aggregate 128 carried within a work unit or tank 130. The tank 130 is free to rotate about bearing 132. In this utilization the motor 134 is not mounted on the tank but secured to a firm foundation 136 and through crank 138 and arm 140 an oscillation in cylinder 72 is induced. Cylinder 72 is mounted by means of supports 142 and 144 on slider 146. In operation motor 134 induces oscillations in cylinder 72 which is constrained to linear movement along the slider 146. Piston 84 is driven to oscillate by the air spring effect and thereby through rod 148 and linkage attached thereto oscillating tank 130. With proper system design the system can be made to resonate, thereby amplifying and accentuating the oscillations from motor 134 and through piston rod 148 transferring this accentuated and amplified oscillation to the tank 130, more thoroughly mixing aggregate 128 therein.

Also shown in FIG. 10 is relief unit 148 including a piston 150 and piston rod 152. The relief unit is secured through the piston rod to the cylinder end 80. This double acting air spring may utilize any of the forms of invention previously described or may rely for its stability on the stability of the cylinder piston unit which drives it. The effect of the relief unit is to partially counterbalance the forces which develop in the crank arm and bearings when the cylinder oscillates toward and away from the motor. In this manner the strength requirements for the crank arm and bearings are reduced so that their sizes and weights may be made less.

Having described my invention, I now claim:

1. In an oscillatory motion coupler including,
a piston mounted within a cylinder,
said piston being free to oscillate along the axis of said cylinder,
means for inducing oscillatory motion between said piston and said cylinder,
wherein the improvement comprises:
passage means for adjusting the quantity of gas in the opposite ends of said cylinder by the action of said piston to stabilize the location of the piston mean oscillatory point with respect to the cylinder.

2. The improved oscillatory motion coupler of claim 1 wherein:
the natural frequency of said piston and said cylinder substantially corresponds to the frequency of the means for inducing oscillatory motion.

3. The improved oscillatory motion coupler of claim 1 wherein:
said passage means is made effective by both the pumping and the valving action of said piston.

4. The improved oscillatory motion coupler of claim 1 wherein:
said passage means including a passageway formed in the cylinder wall to permit a flow of air by action of the oscillating piston.

5. The improved oscillatory motion coupler of claim 4 wherein:
the natural frequency of said piston and said cylinder substantially corresponds to the frequency of the means for inducing oscillatory motion.

6. The improved oscillatory motion coupler of claim 1 wherein:
said passage means including at least one vent in the cylinder wall.

7. The improved oscillatory motion coupler of claim 1 wherein:
said passage means including at least one vent in the cylinder wall,
said vent located within the region of the longitudinal midpoint of the cylinder.

8. The improved oscillatory motion coupler of claim 3 wherein:
said passage means comprises at least one vent located in the region of the longitudinal midpoint of said cylinder during which the oscillatory motion of the piston permits pneumatic communication between the interior of said cylinder and the exterior of said cylinder.

9. The improved oscillatory motion device of claim 8 wherein:

the exterior of said cylinder is open to ambient atmospheric pressure.

10. The improved oscillatory motion coupler of claim 1 wherein:
said passage means comprises a multiplicity of vents in the cylinder wall.

11. The improved oscillatory motion coupler of claim 1 wherein:
said passage means comprises a vent located at one end of said cylinder.

12. The improved oscillatory motion coupler of claim 11 wherein:
said vent is ducted to a valve whereby the quantity of gas permitted to escape from the cylinder may be varied.

13. The improved oscillatory motion coupler of claim 3 wherein:
said passage means comprises at least one vent in said cylinder which during the oscillatory motion of the piston permits pneumatic communication between the interior of said cylinder and the exterior of said cylinder,
the exterior of said cylinder including the vicinity of said vent comprises a plenum chamber sealed from the atmosphere.

14. The improved oscillatory motion coupler of claim 3 wherein:
said passage means comprises first and second vent means,
each of said vent means comprises at least one vent,
said first vent means being in pneumatic communication with an end of said cylinder during one extreme of the oscillatory movement of said piston and the said second vent means being in pneumatic communication with the opposite end of said cylinder during the other extreme of said pistons oscillatory movement.

15. The improved oscillatory motion coupler of claim 14 wherein:
the exterior of said cylinder in the vicinity of said vent comprises a plenum chamber sealed from the atmosphere.

16. The improved oscillatory motion coupler of claim 1 wherein:
said passage means comprises means for causing a flow of gas from one side of said piston to the other in the opposite direction as the leakage flow past said piston.

17. The improved oscillatory motion coupler of claim 16 wherein said passage means comprises a taper in said cylinder walls whereby one end of said cylinder has a larger diameter than the other and further including, vent means located at the smallest end of said cylinder.

18. The improved oscillatory motion coupler of claim 16 wherein said passage means are located in the central portion of said cylinder and are effective to increase the flow of gas from one end of said cylinder to the other only during a portion of the oscillatory cycle of said piston.

19. The improved oscillatory motion coupler of claim 18 wherein:
said passage means comprises at least one longitudinal groove in the wall of said cylinder.

20. The improved oscillatory motion coupler of claim 18 wherein:
said passage means comprises at least one set of communicating vents,
said communicating vents comprising pneumatically interconnected vents spaced on opposite sides of the longitudinal center of said cylinder and communicating with the interior of said cylinder,
and whereby during a portion of said pistons oscillatory travel a pneumatic interconnection is provided from one end of said cylinder to the other end and by-passing said piston.

21. The improved oscillatory motion coupler of claim 18 wherein:
said passage means comprises a taper of said cylinder beginning at a point spaced on either side of the center of said cylinder and tapering to the largest diameter in the central region of said cylinder.

22. The improved oscillatory motion coupler of claim 1 including:
means for transferring force from said piston to the exterior of said cylinder.

* * * * *